(12) United States Patent (10) Patent No.: US 8,738,019 B2
Gorokhov et al. (45) Date of Patent: *May 27, 2014

(54) METHOD AND SYSTEM FOR DEASSIGNMENT OF RESOURCES IN A WIRELESS COMMUNICATION SYSTEM

(75) Inventors: Alexei Gorokhov, San Diego, CA (US); Avneesh Agrawal, San Diego, CA (US); Aamod Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 2799 days.

This patent is subject to a terminal disclaimer.

(21) Appl. No.: 11/369,494

(22) Filed: Mar. 7, 2006

(65) Prior Publication Data

US 2007/0211658 A1 Sep. 13, 2007

(51) Int. Cl.
*H04W 74/00* (2009.01)
(52) U.S. Cl.
USPC ......... 455/452.1; 455/450; 455/509; 370/431
(58) Field of Classification Search
USPC ............... 370/431, 348; 455/509, 450, 452.1
See application file for complete search history.

(56) References Cited

U.S. PATENT DOCUMENTS

| | | | |
|---|---|---|---|
| 6,529,497 B1 * | 3/2003 | Hjelm et al. | 370/347 |
| 6,532,227 B1 | 3/2003 | Leppisaari et al. | |
| 6,564,060 B1 | 5/2003 | Hoagland | |
| 7,526,292 B2 * | 4/2009 | Kim et al. | 455/450 |
| 2002/0036985 A1 | 3/2002 | Jonas et al. | |
| 2002/0165989 A1 | 11/2002 | Etoh | |
| 2003/0063688 A1 | 4/2003 | Noda | |
| 2003/0093532 A1 | 5/2003 | Hwang et al. | |
| 2003/0097498 A1 | 5/2003 | Sano et al. | |
| 2003/0174645 A1 | 9/2003 | Paratainen et al. | |
| 2004/0072540 A1 | 4/2004 | Wilson et al. | |
| 2005/0030964 A1 | 2/2005 | Tiedemann, Jr. et al. | |
| 2006/0034173 A1 * | 2/2006 | Teague et al. | 370/235 |
| 2006/0062282 A1 | 3/2006 | Wright | |
| 2006/0133312 A1 | 6/2006 | Harrison Teague et al. | |
| 2006/0136790 A1 | 6/2006 | Julian et al. | |
| 2006/0286974 A1 | 12/2006 | Gore et al. | |
| 2007/0060178 A1 | 3/2007 | Gorokhov et al. | |
| 2007/0121538 A1 | 5/2007 | Ode et al. | |
| 2007/0147539 A1 | 6/2007 | Gorokhov et al. | |
| 2007/0211668 A1 | 9/2007 | Agrawal et al. | |
| 2009/0036135 A1 | 2/2009 | Matsuo et al. | |

FOREIGN PATENT DOCUMENTS

| | | | | |
|---|---|---|---|---|
| EP | 1589702 A1 | 10/2005 | | |
| WO | 9848851 | 10/1998 | | |
| WO | WO 9848581 A1 * | 10/1998 | ............... | H04Q 7/22 |
| WO | 0022866 | 4/2000 | | |

OTHER PUBLICATIONS

European Search Report—EP08020103—Search Authority—Munich Patent Office—Jan. 8, 2009.

(Continued)

*Primary Examiner* — Qun Shen
(74) *Attorney, Agent, or Firm* — Peng Zhu

(57) ABSTRACT

Systems and methods are disclosed that facilitate dynamically de-assigning resources and communication channels for transmitting messages indicative of resource de-assigning. Systems and method for generating and interpreting de-assignment messages are also provided.

57 Claims, 13 Drawing Sheets

(56) References Cited

OTHER PUBLICATIONS

Tomcik, Jim, MBFDD and MBTDD wideband mode: technology overview, IEEE C802.20-05/68r1, Oct. 28, 2005, pp. 1-109, XP-002422172.
International Search Report—PCT/US2007/063516, International Search Authority—European Patent Office—Aug. 2, 2007.
International Preliminary Report on Patentability—PCT/US2007/063516, International Search Authority—The International Bureau of WPO—Geneva, Switzerland—Sep. 9, 2008.
Written Opinion—PCT/US2007/063516, International Search Authority—European Patent Office—Aug. 2, 2007.
Tomcik.: IEEE 802.20 Working Group on Mobile Broadband Wireless Access, MBTDD Wideband Mode Performance Report 2, IEEE C802-05/88r1, pp. 49-51, Jan. 6, 2006.

* cited by examiner

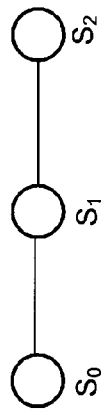

METHOD AND SYSTEM FOR DEASSIGNMENT OF RESOURCES IN A WIRELESS COMMUNICATION SYSTEM

BACKGROUND

I. Field

The following description relates generally to wireless communication, and more particularly to dynamically managing network resources by utilizing reserved de-assignment resources.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

For example, it can be expensive (e.g., bit-wise, . . . ) to precisely describe channel assignments in a wireless networking environment. Such can be especially true when users (e.g., mobile devices) are not required to be aware of system resource assignments to other users of the wireless system. In such cases, assignments of system resources, such as broadcast channels an the like can require updating on virtually every broadcast cycle in order to provide each user with adequate bandwidth and/or networking power, which can tax the wireless network system and expedite realization of network limitations. Additionally, by requiring such continuous updates and/or complete reassignment messages to be transmitted to users so frequently, such conventional methods of system resource allocation can require expensive and high-powered communication components (e.g., transceivers, processors, . . . ) just to meet system demand.

Multiple-access communication systems typically employ methods of assigning system resources to the individual users of the system. When such assignments change rapidly over time, system overhead required just to manage the assignments can become a significant portion of the overall system capacity. When assignments are sent using messages that constrain the assignment of resource blocks to a subset of the total possible permutations of blocks, assignment expense can be reduced somewhat, but by definition, assignments are constrained. Further, in a system where assignments are "sticky" (e.g., an assignment persists over time rather than having a deterministic expiration time), it can be difficult to formulate a constrained den assignment messages that addresses an instantaneous available resources.

In view of at least the above, there exists a need for a system and/or methodology of improving de-assignment notification and reducing overhead in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method comprises determining whether to de-assign one or more resources assigned to an access terminal for at least two frames and if de-assignment is determined, then generating a message indicative of a request to de-assign resources. The method also includes transmitting the message on a reserved de-assignment channel.

According to another aspect, a wireless communication apparatus comprises a processor configured to determine whether to de-assign one or more resources assigned to an access terminal, generate a message indicative of a request to de-assign resources, and instruct transmission of the message on reserved de-assignment channel resources. The processor may be coupled to a memory coupled to the processor.

According to yet another aspect, an apparatus can comprise means for determining whether to de-assign one or more resources assigned to an access terminal for at least two frames and means for, if de-assignment is determined, generating a message indicative of a request to de-assign resources. The apparatus may further comprise means for assigning transmission of the message on a reserved de-assignment channel.

Yet another aspect relates to a processor-readable medium having stored thereon instructions for use by a processor. The instructions comprise instructions for determining whether to de-assign one or more resources assigned to an access terminal for at least two fives and if de-assignment is determined, then generating a message indicative of a request to de-assign resources. The instructions also include instructions for transmitting the message on a reserved de-assignment channel.

According to an aspect, a method comprises determining whether a de-assignment message, corresponding to a request to de-assign one or more resources assigned to an access terminal for at least two frames, has been received over communication channel resources reserved for de-assignment messages and if the message has been received, determining the resources that are to be de-assigned.

According to another aspect, a wireless communication apparatus comprises a processor configured to determine whether a de-assignment message, corresponding to a request to de-assign one or more resources assigned to an access terminal for at least two frames, has been received over communication channel resources reserved for de-assignment messages. The apparatus also comprises a memory coupled to the processor.

According to yet another aspect, an apparatus can comprise means for determining whether a de-assignment message, corresponding to a request to de-assign one or more resources assigned to an access terminal for at least two frames, has been received over communication channel resources reserved for de-assignment messages, and means for, if the message has been received, determining the resources that are to be de-assigned.

Yet another aspect relates to a processor-readable medium having stored thereon instructions for use by a processor. The instructions comprise instructions for determining whether a de-assignment message, corresponding to a request to de-assign one or more resources assigned to an access terminal for at least two frames, has been received over communication channel resources reserved for de-assignment messages, and if the message has been received, determining the resources that are to be de-assigned.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIGS. 7A and 7B illustrate aspects of messages that may be transmitted on a de-assignment channel.

FIG. 8 illustrates aspects of an acknowledgement message with de-assignment indications that may be transmitted on an acknowledgment channel.

DETAILED DESCRIPTION

Figure 1:
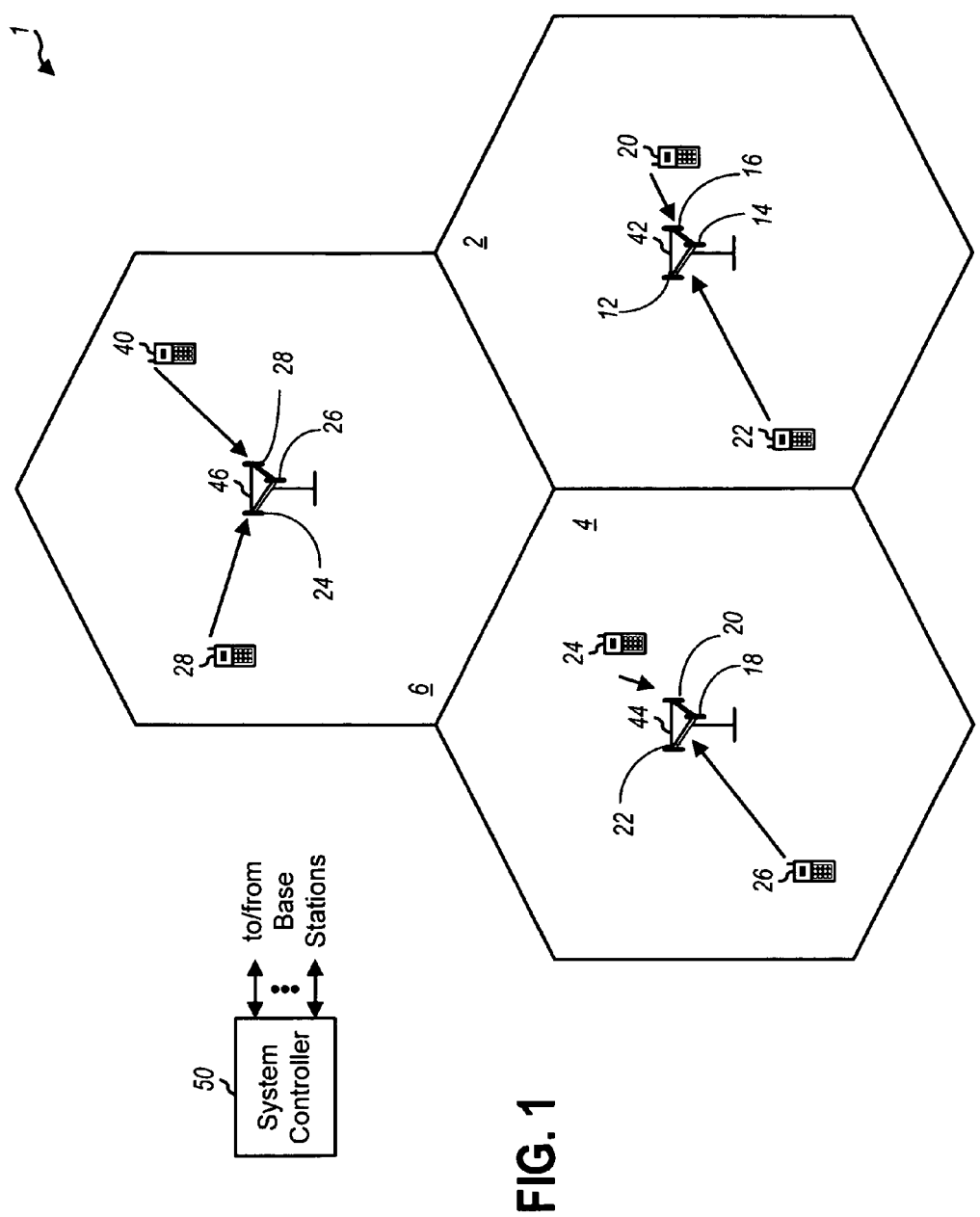
FIG. 1 illustrates aspects of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, user equipment, etc. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include, but are not limited to, magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and integrated circuits such as read only memories, programmable read only memories, and electrically erasable programmable read only memories.

Referring to FIG. 1, a multiple access wireless communication system according to one embodiment is illustrated. A multiple access wireless communication system 1 includes multiple cells, e.g. cells 2, 104, and 106. In FIG. 1, each cell 2, 4, and 6 may include an access point that includes multiple sectors. The multiple sectors are formed by groups of antennas each responsible for communication with access terminals in a portion of the cell. In cell 2, antenna groups, 12, 14, and 16 each correspond to a different sector. In cell 4, antenna groups 18, 20, and 22 each correspond to a different sector. In cell 6, antenna groups 24, 26, and 28 each correspond to a different sector.

Each cell includes several access terminals which are in communication with one or more sectors of each access point. For example, access terminals 30 and 32 are in communication with access point base 42, access terminals 34 and 36 are in communication with access point 44, and access terminals 38 and 40 are in communication with access point 46.

Controller 50 is coupled to each of the cells 2, 4, and 6. Controller 50 may contain one or more connections to multiple networks, e.g. the Internet, other packet based networks, or circuit switched voice networks that provide information to, and from, the access terminals in communication with the cells of the multiple access wireless communication system 1. The controller 50 includes, or is coupled with, a scheduler that schedules transmission from and to access terminals. In other embodiments, the scheduler may reside in each individual cell, each sector of a cell, or a combination thereof.

In certain aspects, assignments for communication resources for a given access terminal, for either, or both, the forward link and the reverse link, is sticky. In such cases, once received the assignment is maintained until a given event occurs, for a predetermined number of frames, e.g. transmissions to the terminal or predetermined transmission periods, or some other system constraints, e.g. interference conditions.

According to one aspect, decremental assignments can be employed to subtract from, rather than completely de-assign, "sticky" assignments (e.g., assignments that are valid until a next assignment signal is received). The described decremental assignments can facilitate more robust system resource management, particularly with regard to instantaneously available system resources, as well as providing a more robust user experience at reduced overhead cost than can be achieved by conventional systems and/or methodologies.

Moreover, in order to provide for efficient decremental resource de-assignment a channel, i.e. predetermined resources, may be allocated for the transmission of de-assignment messages, whether complete or partial. In some aspects, these resources may be physical resources such as subcarriers, OFDM symbols, or combinations of subcarriers and OFDM symbols. In other aspects, the resources may correspond to logical resources that are then assigned to physical resources, based upon a mapping scheme, frequency hopping algorithm, or some other approach. In certain aspects, the decision to de-assign resources may be based in part as to the types of resources, physical, logical, or the like, that are assigned.

In additional aspects, the resource de-assignments need not be decremental and may be complete de-assignments for one or more frames, superframes, or some number of OFDM symbols.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of; or in combination with physical sectors. Such an approach is depicted and disclosed in co-pending U.S. patent application Ser. No. 11/260,895, entitled "Adaptive Sectorization In Cellular System," which is incorporated herein by reference.

Figure 2A:
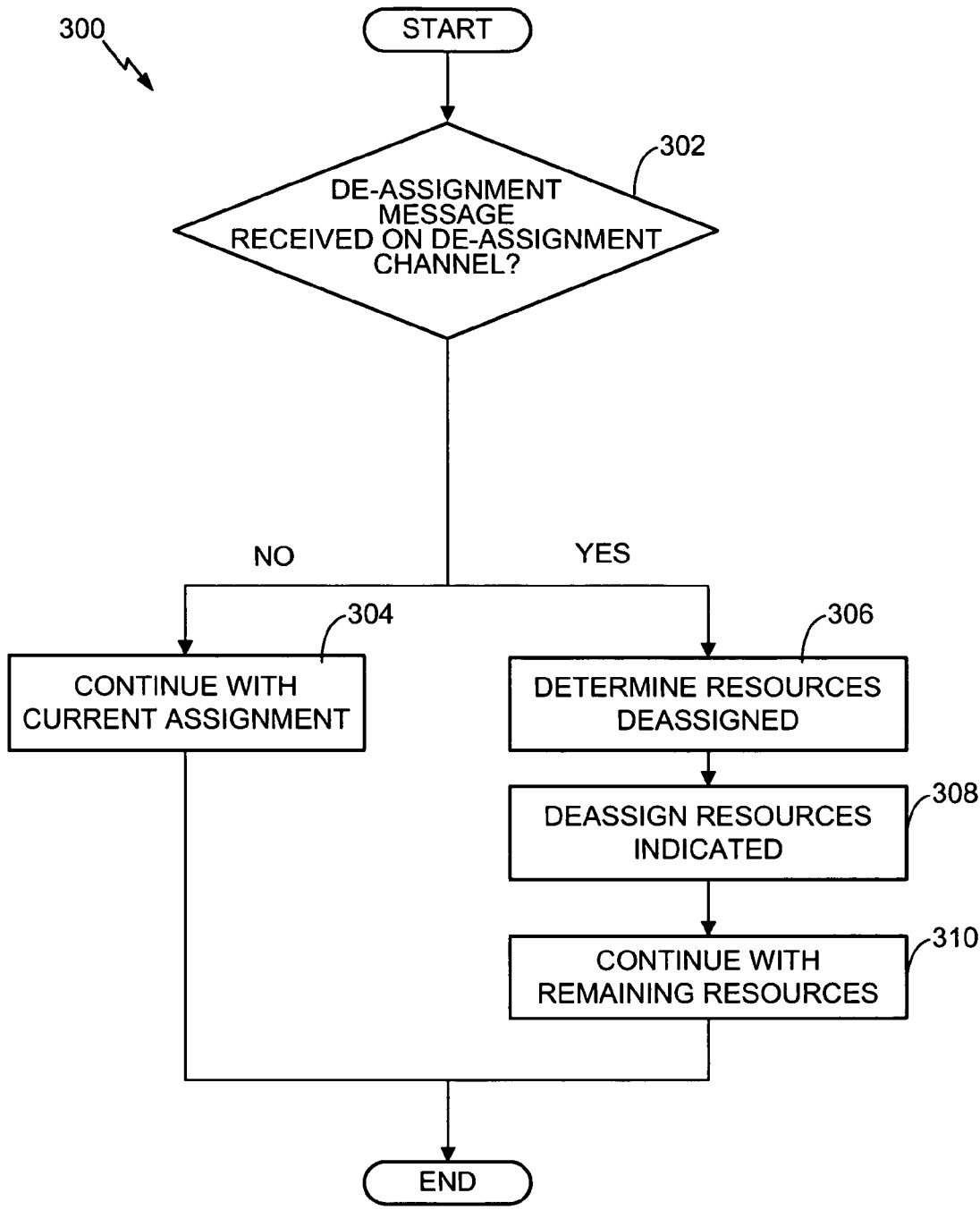
FIG. 2A illustrates aspects of a method for interpreting resource assignment messages.

FIG. 2A illustrates aspects of a method 300 for interpreting resource assignment messages. An access terminal determines whether a de-assignment message has been received on a de-assignment channel reserved for communication of de-assignment messages, block 302. If a message is not detected, the current assignment is maintained, block 304.

If a de-assignment message has been received, a determination is made as to what resources are being de-assigned, block 306. Aspects of approaches to determining what resources are being de-assigned are depicted and discussed with respect to FIGS. 6-7B. Once the determination is made, the access terminal will de-assign, i.e. cease utilizing the resources that have been de-assigned, block 308, and continue utilizing the resources that have not been de-assigned, block 310. A used herein, ceasing utilizing may imply one or both of ceasing transmission of signals or ceasing of listening, or attempting to demodulate, received signals on the resources.

Figure 2B:
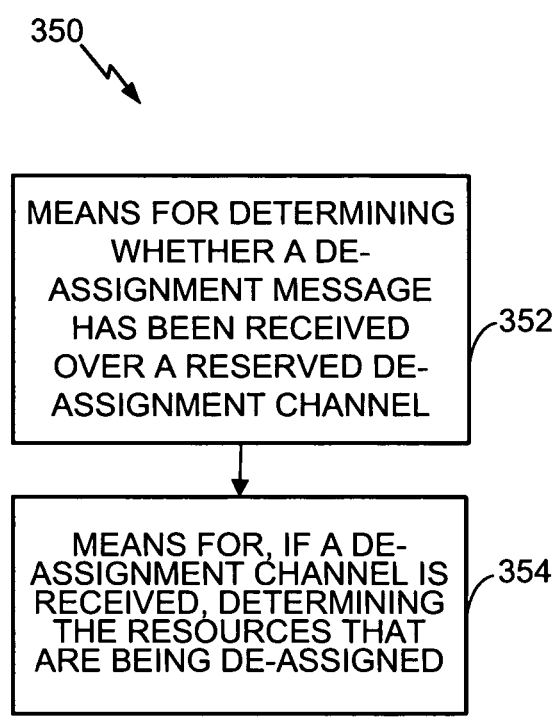
FIG. 2B illustrates aspects of an apparatus for interpreting resource assignment messages.

FIG. 2B illustrates aspects of an apparatus 350 for interpreting resource assignment messages. In FIG. 2B, means 352 for determining whether a de-assignment message has been received over a reserved de-assignment channel is in communication with means 354 for, if a de-assignment channel is received, determining the resources that are being de-assigned.

Figure 3A:
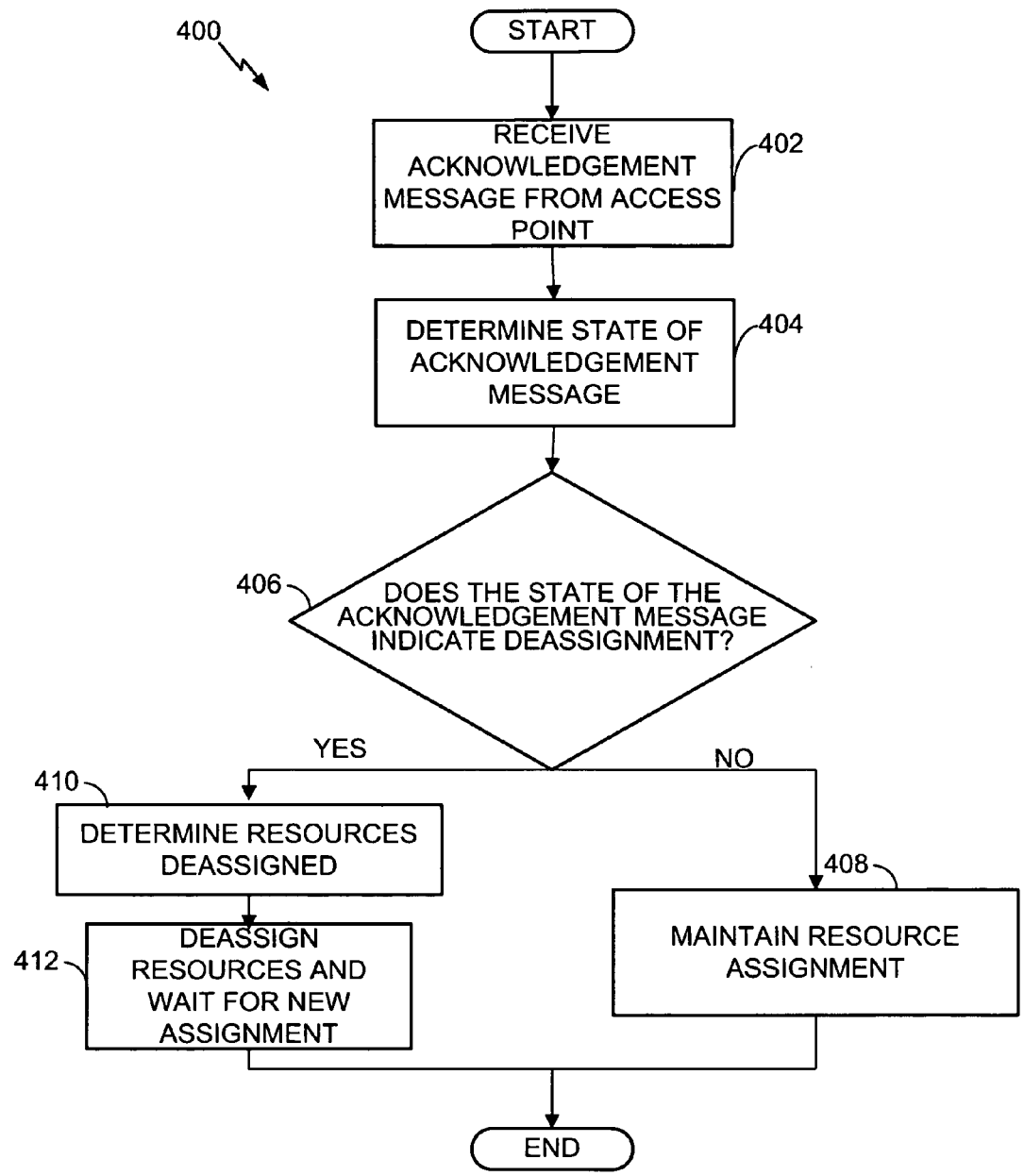
FIG. 3A illustrates aspects of another method for interpreting resource assignment messages.

FIG. 3A illustrates aspects of another method 400 for interpreting resource assignment messages. An access terminal determines whether an acknowledgement message has been received on a channel reserved for communication of acknowledgement messages, block 402. A state of the message is then determined, block 404. As used herein, a state may mean properties of the message such as value, power, timing, or some other criteria. Aspects of such states are depicted and discussed with respect to FIG. 8.

A determination is then made whether the state of the acknowledgement message is indicative of a de-assignment, block 406. If the state does not indicate de-assignment, then the curtly assigned resources are maintained, block 408. If the state is indicative of de-assignment, then a determination is made as to what resources are being de-assigned, block 410. In certain aspects, an acknowledgement message with de-assignment indicates a full de-assignment. Once the determination is made, the access terminal will de-assign, e.g. cease utilizing the resources that have been de-assigned, block 412, and continue utilizing the resources, if any, that have not been de-assigned. A used herein, ceasing utilizing may imply one or both of ceasing transmission of signals or ceasing of listening, or attempting to demodulate, received signals on the resources.

Figure 3B:
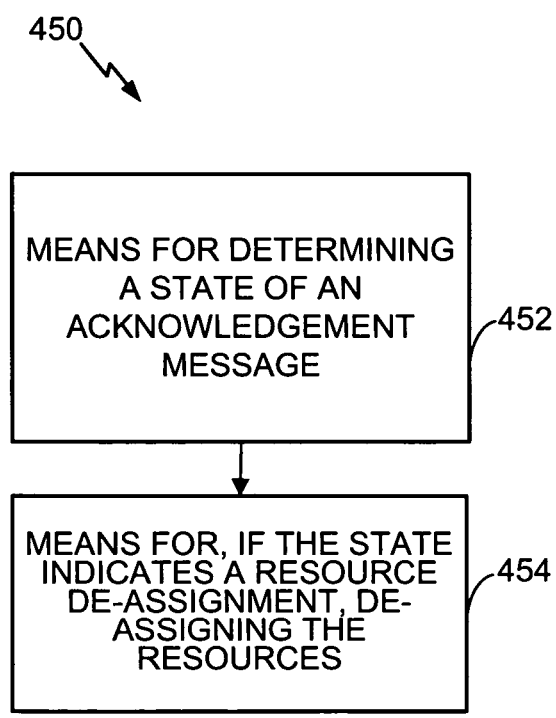
FIG. 3B illustrates aspects of another apparatus for interpreting resource assignment messages.

FIG. 3B illustrates aspects of an apparatus 450 for interpreting resource assignment messages. In FIG. 3B, means 452 for determining a state of an acknowledgement message is in communication with means 454 for, if a de-assignment is indicated by the state of the acknowledgement message, determining the resources that are being de-assigned.

Figure 4A:
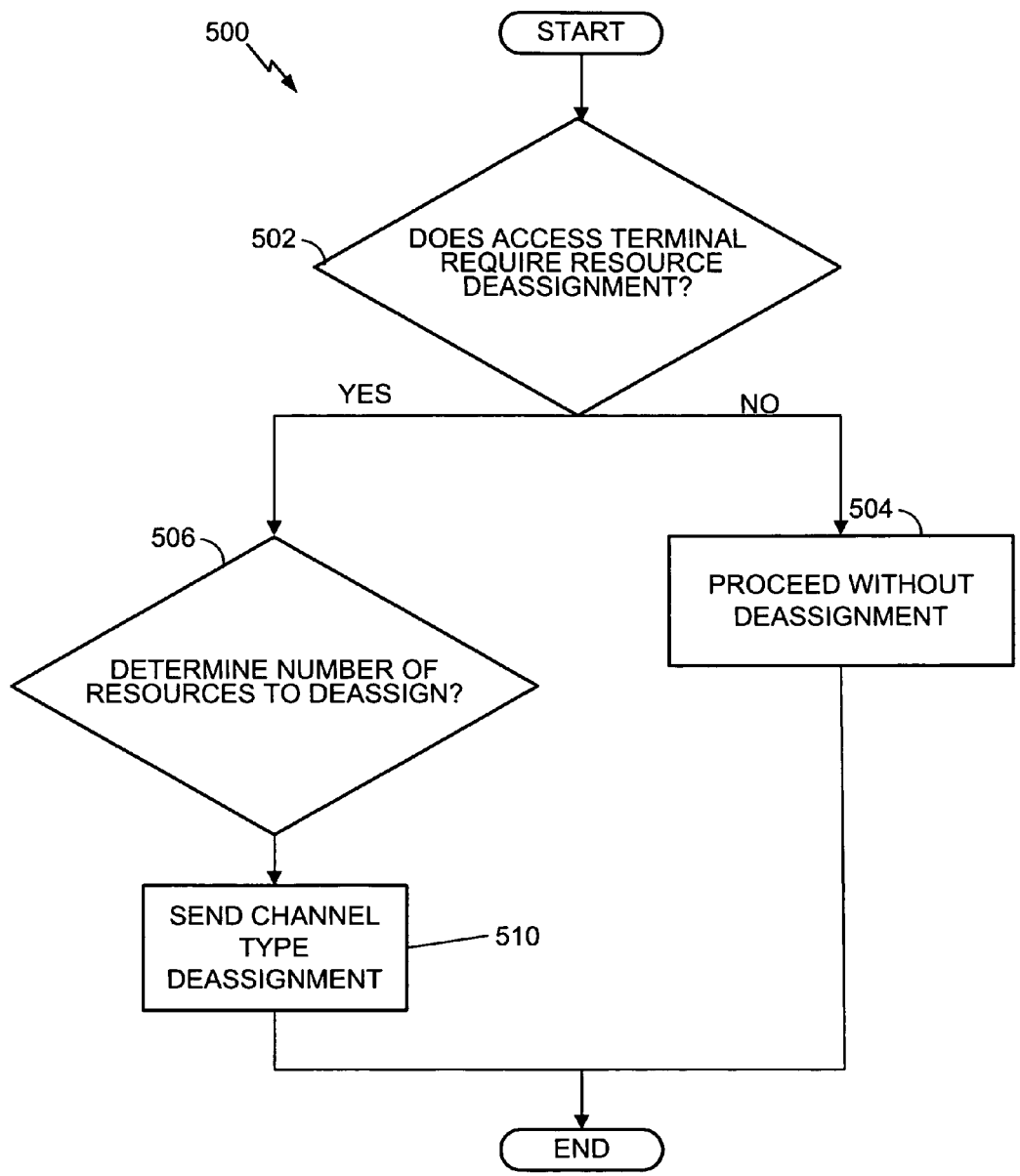
FIG. 4A illustrates aspects of a method for signaling resource de-assignments.

FIG. 4A illustrates aspects of a method 500 for signaling resource de-assignments. An access point determines, for one or more access terminals for future transmissions, whether to de-assign a resource, block 502. The determination may be made on a terminal by terminal basis, or by in the aggregate for all or subsets of the terminals that have assigned resources for the sector, or cell. The resources may be logical resources such as nodes of a channel tree or may be physical resources such as sub-carriers, OFDM symbols, or combinations thereof. In addition, the resources may be Walsh or other orthogonal codes, in the case where such codes are utilized as an additional orthogonality dimension for one or more channel of the wireless communication system.

If a de-assignment for an access terminal for some resources are not required, communication, including assignments, other control, and data communication may then proceed without transmitting de-assignments utilizing de-assignment channel resources, block 504.

If de-assignment is determined for one or more access terminals, then the number of resources that should be de-assigned for each of the one or more access terminals is determined, block 506. The number may be based upon any scheduler optimization and/or other system criteria. In certain aspects, if decremental assignments are not utilized, then this block may be omitted, as all of the resources are de-assigned for each terminal where de-assignment is determined.

A de-assignment message is then transmitted over a reserved de-assignment channel, block 508. The reserved de-assignment channel may be logical resources that are mapped to physical resources such as subcarriers, OFDM symbols, or combinations of subcarriers and OFDM symbols. In certain aspects, the logical resources used for de-assignment messages may be the same as resources reserved for acknowledgement messages or resources reserved for both acknowledgement and de-assignment channel messages. Alternatively, the reserved de-assignment channel may be physical resources reserved for transmission of de-assignment messages.

Figure 4B:
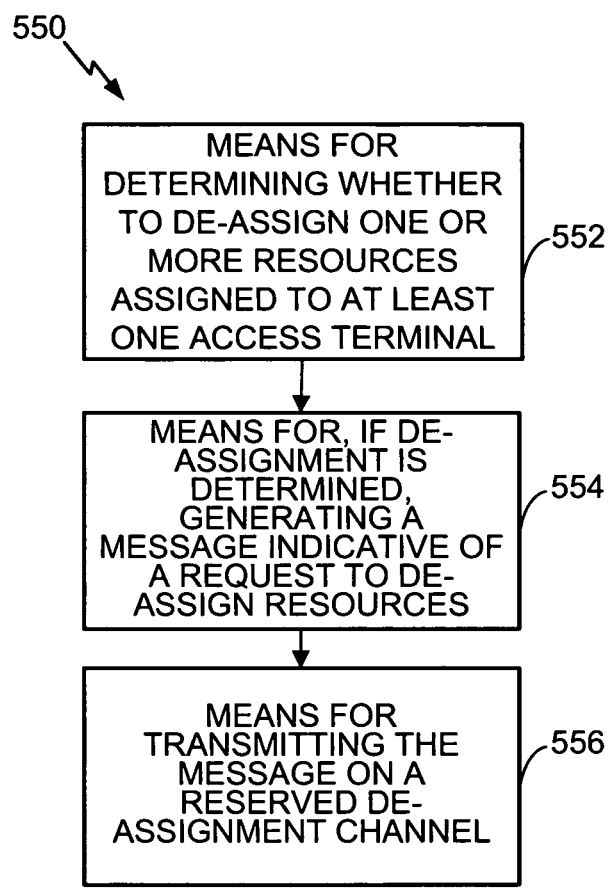
FIG. 4B illustrates aspects of an apparatus for providing resource de-assignments.

FIG. 4B illustrates aspects of an apparatus 550 for providing resource de-assignments. In FIG. 43, means 552 for determining whether to de-assign one or more resources assigned to an access terminal for at least two flumes is in communication with means 554 for, if de-assignment is determined, generating a message indicative of a request to de-assign resources. Means 554 is in communication with means 556 for assigning transmission of the message on a reserved de-assignment channel.

The formats and message types for de-assignment messages are depicted and discussed with respect to FIGS. 7A, 7B, and 8. It should be noted that in some cases, the deassignment may be implicit and no de-assignment message be sent on the reserved resources. An exemplary description of implicit de-assignment messages that may be utilized is depicted and disclosed in co-pending U.S. patent application Ser. No. 11/020,583, entitled "A Method Of Implicit Deassignment Of Resources," which is incorporated herein by reference.

The use of both implicit and explicit de-assignment on reserved resources allows for more efficient of use of system resources depending on power budgets, user locations in sectors, and/or other factors.

Figure 5A:
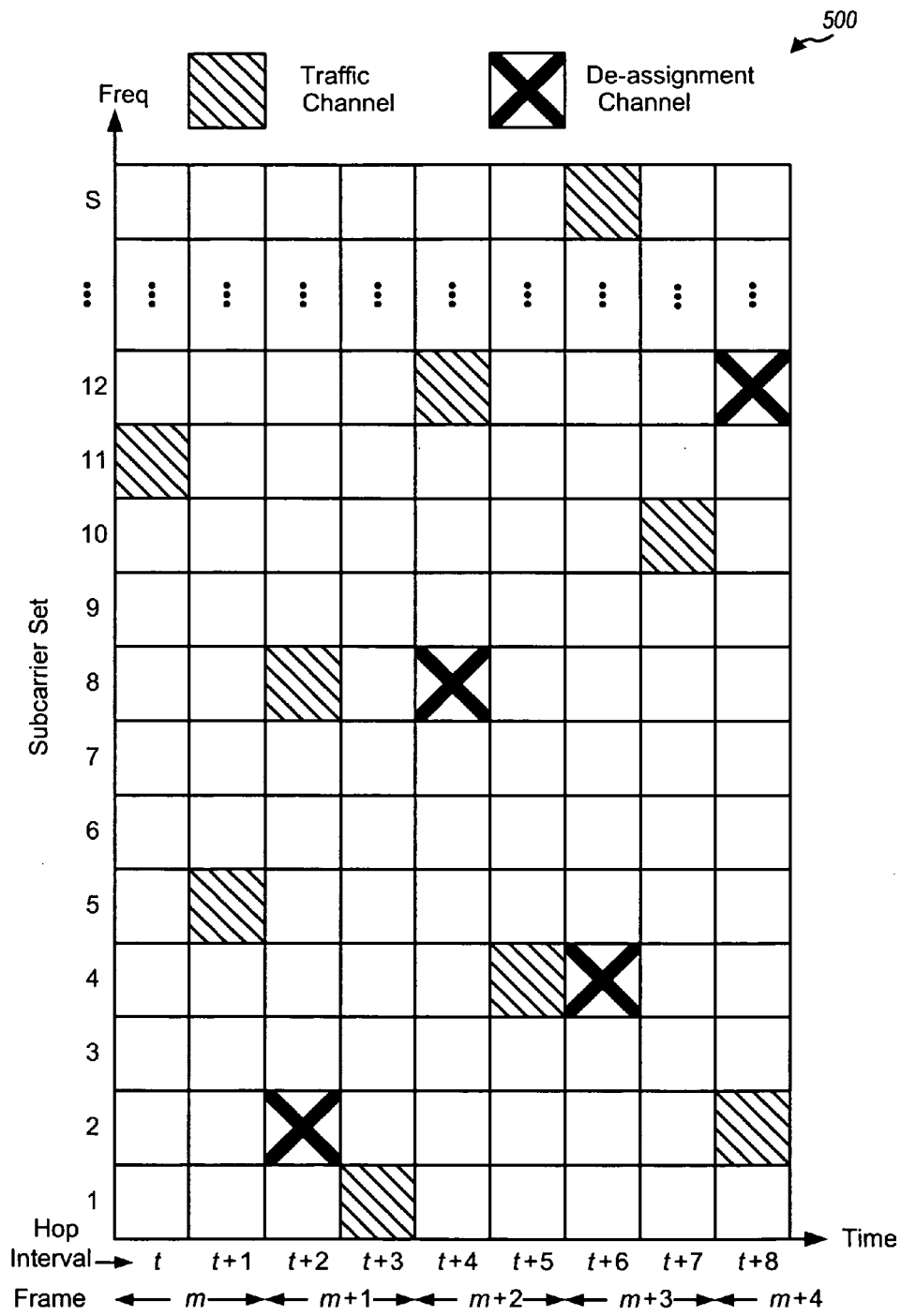
FIGS. 5A and 5B illustrate aspects of a signaling transmission scheme for a de-assignment channel.
Figure 5B:
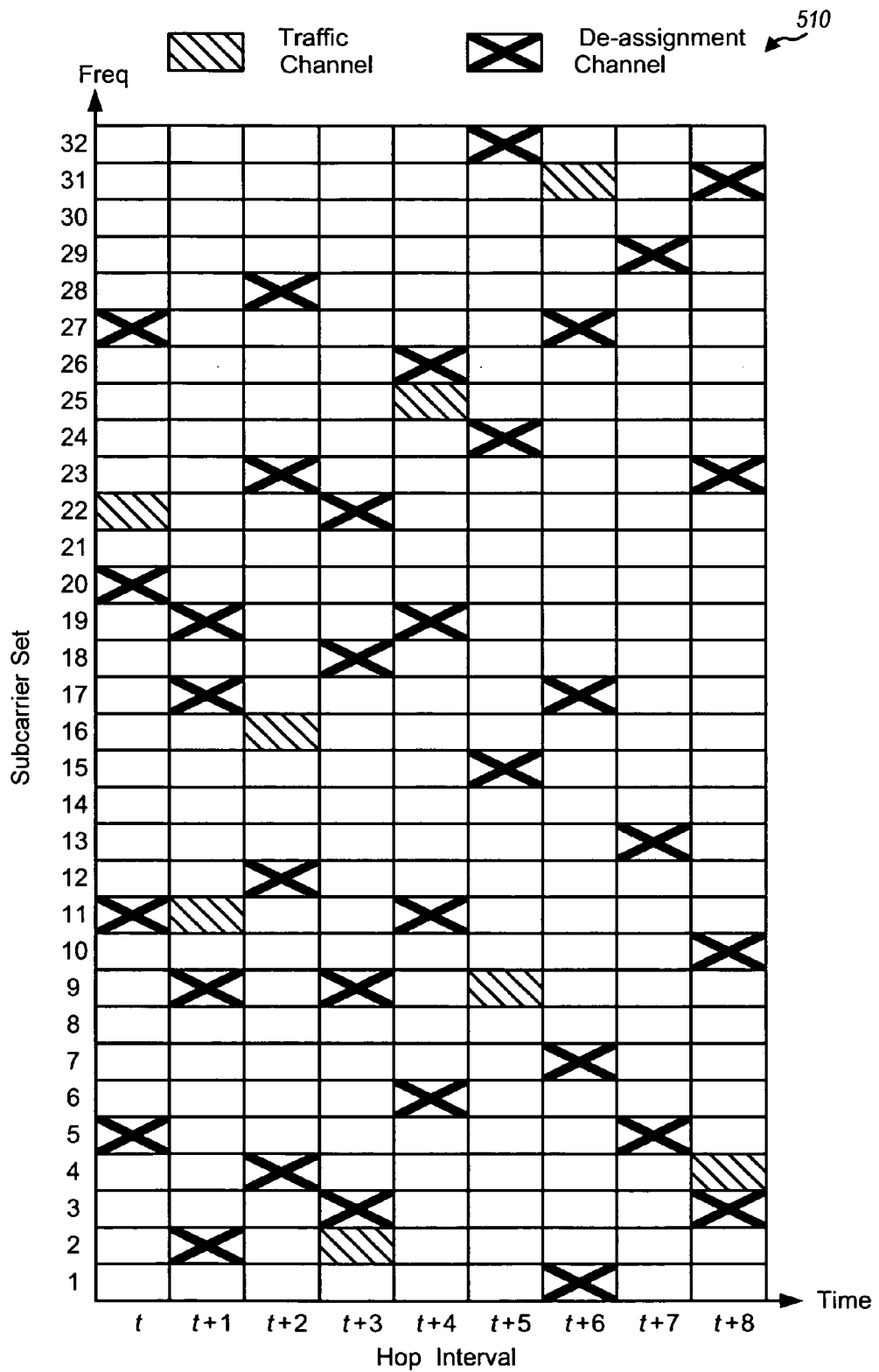

FIGS. 5A and 5B illustrate aspects of a signaling transmission scheme for a de-assignment channel. In one aspect, the de-assignment channel is mapped to one or more fixed subcarrier sets, and the traffic, which may also be termed data, channels hop around the fixed de-assignment channel. In yet another embodiment, the S subcarrier sets are arranged into G regions, with each region including S/G consecutive subcarrier sets. The de-assignment channel is then mapped to one subcarrier set in each region.

In certain aspects, the de-assignment channel is mapped from logical resources to the physical resources allotted for transmission. In general, the de-assignment channel may be mapped to time-frequency blocks in a pseudo-random or deterministic manner, which may be the same or different than the manner utilized to map traffic and/or other control channels. The de-assignment channel may be mapped to different subcarrier sets to achieve frequency diversity, e.g., as shown in FIGS. 5A and 5B. In certain aspects, the de-assignment channel is pseudo-random with respect to the traffic channels and equally punctures the traffic channels. This may be achieved by hopping the de-assignment channel, hopping the traffic channels, or hopping both the de-assignment channel and the traffic channels. An FH pattern may indicate mappings for specific time-frequency block(s) for the de-assignment channel in each frame. This FH pattern may be sent to the terminals or may be known a priori by the terminals. In any case, the terminals have knowledge of the time-frequency blocks occupied by the de-assignment channel.

As previously discussed, the de-assignment channel may share logical and physical resources with an acknowledgement channel. Alternatively, acknowledgement messages may be utilized for de-assignment and as such the above discussion may apply to an acknowledgement channel, which is also utilized to transmit de-assignment messages.

Figure 6:
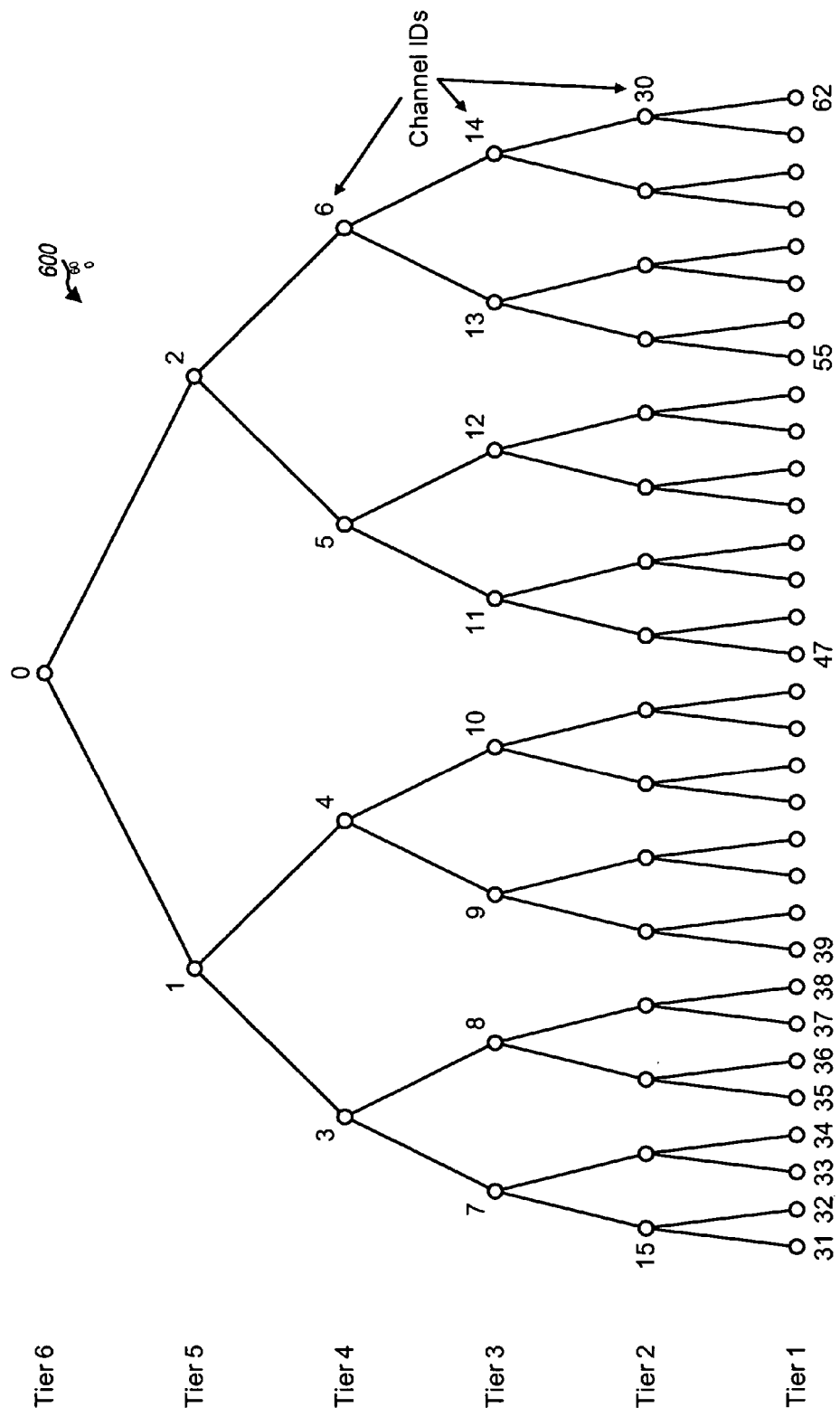
FIG. 6 illustrates aspects of a binary channel tree including logical resources for a de-assignment channel.

FIG. 6 illustrates aspects of a binary channel tree 600. For the embodiment shown in FIG. 6, S=32 subcarrier sets are available for use. A set of traffic channels may be defined with the 32 subcarrier sets. Each traffic channel is assigned a unique channel ID and is mapped to one or more subcarrier sets in each time interval. For example, a traffic channel may be defined for each node in channel tree 600. The traffic channels may be sequentially numbered from top to bottom and from left to right for each tier. The largest traffic channel corresponding to the topmost node is assigned a channel ID of 0 and is mapped to all 32 subcarrier sets. The 32 traffic channels in the lowest tier 1 have channel IDs of 31 through 62 and are called base traffic channels. Each base traffic channel is mapped to one subcarrier set.

The tree structure shown in FIG. 6 places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

In an embodiment, a resource is assigned to each traffic channel that is assigned for use. A resource may also be called a sub-channel or some other terminology. A resource includes pertinent resources used to send a message in each frame. For this embodiment, the messages for each traffic channel may be sent on the assigned resource. The assigned resources may be signaled to the terminal.

In another embodiment, a resource is associated with each of the base traffic channels in the lowest tier of a channel tree. This embodiment allows for assignment of the maximum number of traffic channels of the minimum size. A larger traffic channel corresponding to a node above the lowest tier may use (1) the resources for all base traffic channels under the larger traffic channel, (2) the resource for one of the base traffic channels, e.g., the base traffic channel with the lowest channel ID, or (3) the resources for a subset of the base traffic channels under the larger traffic channel. For options (1) and (3) above, a message for the larger traffic channel may be sent using multiple resources to improve the likelihood of correct reception. If multiple data streams are sent in parallel, e.g., using multiple-input multiple-output (MIMO) transmission, then a larger traffic channel with multiple base traffic channels may be assigned for the transmission. The number of base traffic channels is equal to or greater than the number of packets. Each packet may be mapped to a different base traffic channel.

In yet another embodiment, a resource is assigned to each packet to be acknowledged. A terminal may be assigned one resource if one packet is sent in a frame. A terminal may be assigned multiple resources if multiple packets are sent in a frame, e.g. using either a larger traffic channel or spatial multiplexing to transmit via multiple antennas.

In aspects including the a reserved de-assignment channel or acknowledgment channel used for both de-assignments and acknowledgements, the logical resources reserved may correspond to a single base node per tier 2, or a portion of the resources of each base node, e.g. N subcarriers, N OFDM symbols, or combinations thereof.

Referring to FIGS. 7A and 7B, aspects of messages that may be transmitted on a de-assignment channel are illustrated. In FIG. 7A, a de-assignment message which may be transmitted as part of a unicast packet, a multi-cast packet including multiple de-assignment messages. In FIG. 7A, the message includes a first portion that includes the node, or other logical resource identifier, and a second portion indicating whether the de-assignment applies to forward link communication, reverse link communication, or both. The second portion may, to decrease overhead, be a one-bit message indicating that the de-assignment applies to one of the forward link or reverse link.

The node or resource identifier may identify multiple logical or physical resources, which are being de-assigned. Alternatively, the node or resource identifier may identify a single node or resource to be de-assigned. In further aspects, the node or resource identifier may identify a single base node, e.g. a node from tier 1 of channel tree 800, of at least two base nodes, and such a de-assignment may be interpreted de-assign all base nodes associated with a node at a tier above the base node. In other aspects, the de-assignment may apply to all nodes from tier 3 below, i.e. nodes 31, 33, and 34. Further, the tier and base node may be identified in the first portion, thus allowing improved flexibility as to the amount of resources being de-assigned.

FIG. 7B is similar to the message format of FIG. 7B, except that an additional portion indicating the timing and/or duration of the resource de-assignment is provided. This information, if overhead is available, may be useful to provide decremental de-assignments for periods of high loading or other aspects.

FIG. 8 illustrates aspects of an acknowledgement message with de-assignment indications that may be transmitted on an acknowledgment channel. An acknowledgment message indicating a de-assignment may have three states, $S_1$, $S_2$, and $S_3$. In certain cases, this message transmitted on the acknowledgement channel allowing re-use of the acknowledgement channel for other resources.

In FIG. 8, $S_1$ may correspond to an acknowledgement with no de-assignment of resources, $S_2$ may correspond to a negative acknowledgment with non de-assignment, and $S_3$ may correspond to an acknowledgment with a de-assignment. In certain aspects, $S_1$ may correspond to a bit state of $-1$, $S_2$ may correspond to a bit state of 0, and $S_3$ may correspond to a bit state of 1. In certain aspects, in order to identify the resources being de-assigned by an acknowledgement message, a fixed identification may be utilized. For example, in some aspects a de-assignment by a an acknowledgment message may correspond to always de-assigning the lowest, or in some cases the highest, logical resource ID, e.g. the base node having the highest or lowest node ID. In these aspects, it may be the case that all base nodes that relate to a same predetermined tier as the base node identified by the de-assignment, also be de-assigned.

In certain aspects, where the acknowledgement is 2-bits or greater, additional states may be introduced. For example, a state $S_4$ may indicate a negative acknowledgement with de-assignment, allowing the scheduler to de-assign users in the middle of a re-transmission session, i.e. in the middle of hybrid ARQ retransmission if the packet has not been decoded for a prior transmission or re-transmission.

Figure 9:
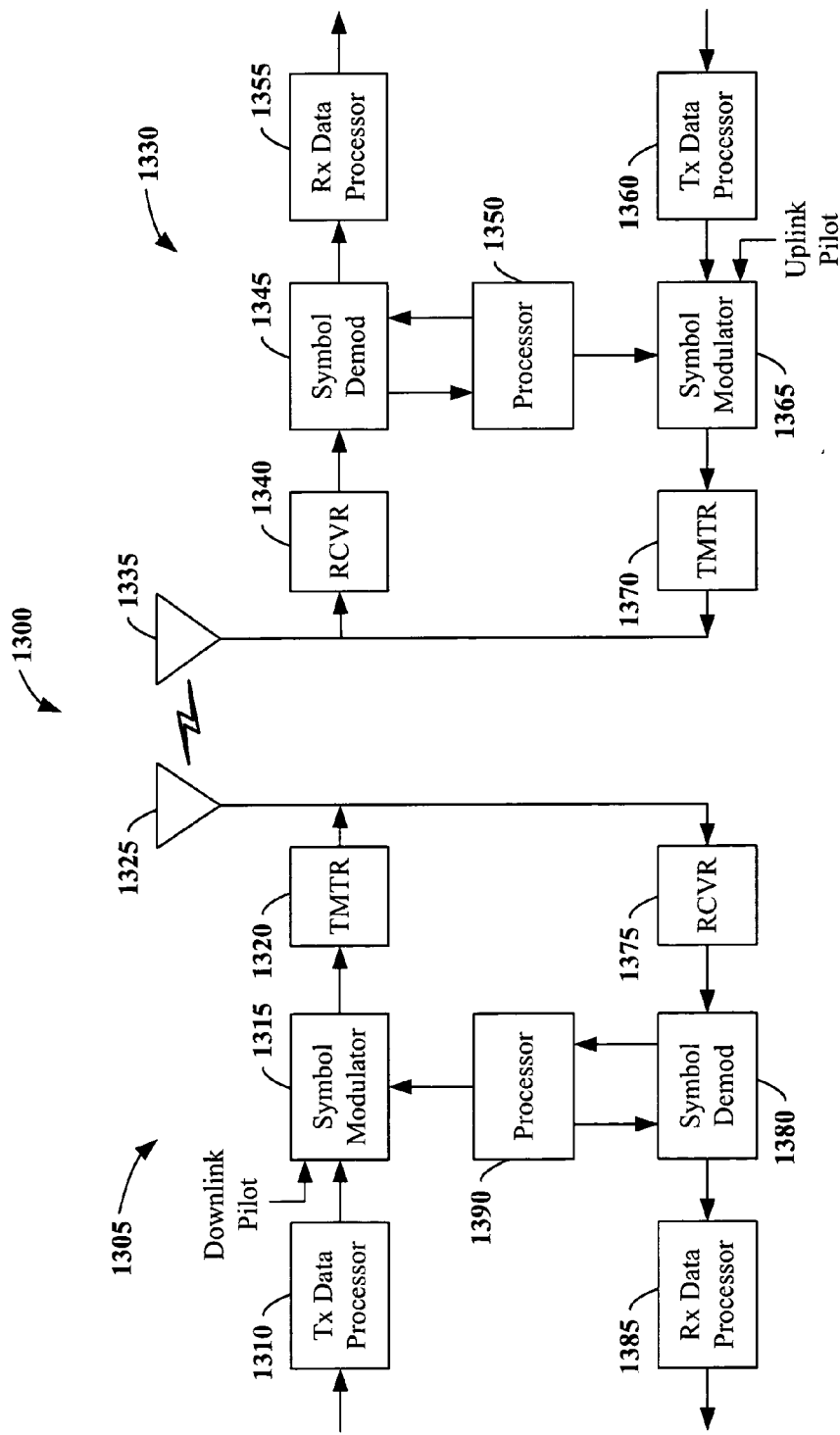
FIG. 9 illustrates aspects of a receiver and transmitter in a wireless communication system.

FIG. 9 illustrates an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 2B, 3B, and 4B) and/or methods (FIGS. 2A, 3A, and 4A) described herein to facilitate wireless communication there between.

Referring now to FIG. 9, on a forward link transmission, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols on the proper subcarriers, provides a signal value of zero for each unused subcarrier, and obtains a set of N transmit symbols for the N subcarriers for each symbol period. Each transmit symbol may be a data symbol, a pilot symbol, or a signal value of zero. The pilot symbols may be sent continuously in each symbol period. It will be appreciated that the pilot symbols may be time division multiplexed (TDM), frequency division multiplexed (FDM), orthogonal frequency division multiplexed (OFDM), code division multiplexed (CDM), etc. Symbol modulator 1320 can transform each set of N transmit symbols to the time domain using an N-point IFFT to obtain a "transformed" symbol that contains mire-domain chips. Symbol modulator 1320 typically repeats a portion of each transformed symbol to obtain a corresponding symbol. The repeated portion is known as a cyclic prefix and is used to combat delay spread in the wireless channel.

A transmitter unit (TMTR) 1320 receives and converts the stream of symbols into one or more analog signals and flier conditions (e.g., amplifies, filters, and frequency upconverts) the analog signals to generate a forward link signal suitable for transmission over the wireless channel. The forward link signal is then transmitted through an antenna 1325 to the terminals. At terminal 1330, an antenna 1335 receives the forward link signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 removes the cyclic prefix appended to each symbol, transforms each received transformed symbol to the frequency domain using an N-point FFT, obtains N received symbols for the N subcarriers for each symbol period, and provides received pilot symbols to a processor 1350 for channel estimation. Symbol demodulator 1345 further receives a frequency response estimate for the forward link from processor 1350, performs data demodulation on the received data symbols to obtain data symbol estimates (which are estimates of the transmitted data symbols), and provides the data symbol estimates to an RX data processor 1355, which demodulates (e.g., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1300.

On the reverse link, a TX data processor 1360 processes traffic data and provides data symbols. A symbol modulator 1365 receives and multiplexes the data symbols with pilot symbols, performs modulation, and provides a stream of symbols. The pilot symbols may be transmitted on subcarriers that have been assigned to terminal 1330 for pilot transmission, where the number of pilot subcarriers for the reverse link may be the same or different from the number of pilot subcarriers for the forward link A transmitter unit 1370 then receives and processes the stream of symbols to generate a reverse link signal, which is transmitted by the antenna 1335 to the access point 1310.

At access point 1310, the reverse link signal from terminal 1330 is received by the antenna 1325 and processed by a receiver unit 1375 to obtain samples. A symbol demodulator 1380 then processes the samples and provides received pilot symbols and data symbol estimates for the reverse link. An RX data processor 1385 processes the data symbol estimates to recover the traffic data transmitted by terminal 1335. A processor 1390 performs channel estimation for each active terminal transmitting on the reverse link.

The processor 1390 may also be configured to perform generation of the different types of de-assignment messages discussed with respect to FIG. 4A. Processor 1350 may be configured to perform the interpretation of de-assignment, and any functions as a consequence thereof, as discussed with respect to FIGS. 2A and 3A.

Processors 1390 and 1350 direct (e.g., control, coordinate, manage, etc.) operation at access point 1310 and terminal 1335, respectively. Respective processors 1390 and 1350 can be associated with memory units (not shown) that store program codes and data. Processors 1390 and 1350 can also perform computations to derive frequency and impulse response estimates for the reverse link and forward link, respectively.

Figure 10:
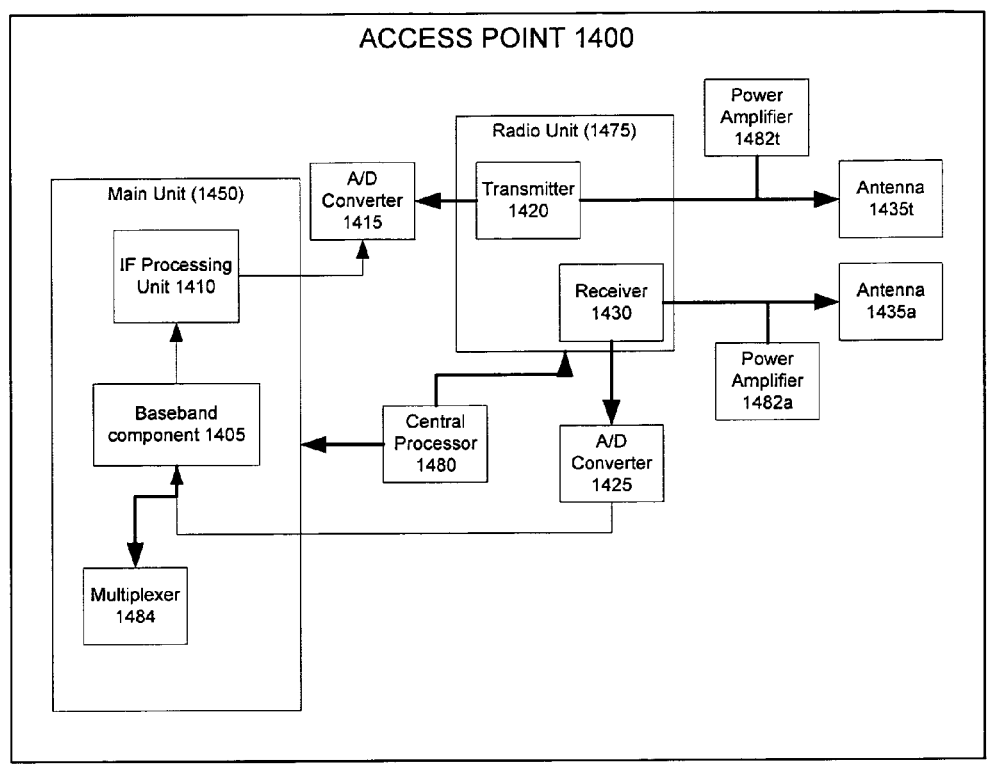
FIG. 10 illustrates aspects of an access point.

Referring to FIG. 10, an access point can comprise a main unit (MU) 1450 and a radio unit (RU) 1475. MU 1450 includes the digital baseband components of an access point. For example, MU 1450 can include a baseband component 1405 and a digital intermediate frequency (IF) processing unit 1410. Digital IF processing unit 1410 digitally processes radio channel data at an intermediate frequency by performing such functions as filtering, channelizing, modulation, and so forth. RU 1475 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1475 can include one or more receivers 1430 connected to one more antennas 1435*a-t* for receiving radio communications from mobile subscriber units. In an aspect, one or more power amplifiers 1482 *a-t* are coupled to one or more antennas 1435 *a-t*. Connected to receiver 1430 is an analog-to-digital (A/D) converter 1425. A/D converter 1425 converts the analog radio communications received by receiver 1430 into digital input for transmission to baseband component 1405 via digital IF processing unit 1410. RU 1475 can also include one or more transmitters 120 connected to either the same or different antenna 1435 for transmitting radio communications to access terminals. Connected to transmitter 1420 is a digital-to-analog (D/A) converter 1415. D/A converter 1415 converts the digital communications received from baseband component 1405 via digital IF processing unit 1410 into analog output for transmission to the mobile subscriber units. In sore aspects, a multiplexer 1484 for multiplexing of multiple-channel signals and multiplexing of a variety of signals including a voice signal and a data signal. A central processor 1480 is coupled to main unit 1450 and Radio Unit for controlling various processing which includes the processing of voice or data signal.

It should be noted that while the above discussion refers to a reserved de-assignment, or acknowledgement, channel, this need not be a channel reserved only for the de-assignment, or acknowledgement. For example, this reserved channel may be a portion of a control channel, such that a predetermined or variable number greater than 1, number of logical or physical resources of the control channel are reserved for the de-assignment, or acknowledgement channel. Further, in some aspects, the resources reserved de-assignment, or acknowledgement may re-used for traffic or other control channel messages when the reserved de-assignment, or acknowledgement, channel is not fully loaded.

For a multiple-access system (e.g., a frequency division multiple-access (FDMA) system, an orthogonal frequency division multiple-access (OFDMA) system, a code division multiple-access (CDMA) system, a time division multiple-access (TDMA) system, etc.), multiple terminals may transmit concurrently on the reverse link. For such a system, the pilot subcarriers may be shared among different terminals. The channel estimation techniques may be used in cases where the pilot subcarriers for each terminal span the entire operating band (possibly except for the band edges). Such a pilot subcarrier structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a clam.

What is claimed is:

1. An apparatus for generating de-assignment messages for a wireless communication device, comprising:
   a processor configured to determine whether to de-assign one or more resources assigned to an access terminal for at least two frames, generate a message indicative of a request to de-assign resources, wherein the message comprises an acknowledgement message having at least three states, and instruct transmission of the message on reserved de-assignment channel resources; and
   a memory coupled to the processor.

2. The apparatus of claim 1, wherein the reserved de-assignment channel resources comprise reserved acknowledgement channel resources.

3. The apparatus of claim 1, wherein the one or more resources comprise logical resources.

4. The apparatus of claim 3, wherein the processor is configured to generate the message identifying a single logical resource that identifies multiple logical resources for de-assignment.

5. The apparatus of claim 3, wherein the processor is configured to generate the message identifying a single logical resource for de-assignment.

6. The apparatus of claim 3, wherein the processor is configured to generate a de-assignment message identifying multiple logical resources for de-assignment.

7. The apparatus of claim 1, wherein the processor is configured to generate the message to indicate whether the resources are de-assigned for reverse link or forward link transmission.

8. The apparatus of claim 1, wherein the processor is configured to generate the message to indicate that resources are de-assigned for reverse link and forward link transmission.

9. The apparatus of claim 1, wherein the de-assignment channel resources are assigned solely to de-assignment channel messages.

10. The apparatus of claim 1, wherein the one or more resources are nodes of a channel tree.

11. The apparatus of claim 10, wherein the processor is configured to identify a single base node of at least two base nodes in the message to de-assign all base nodes associated with a node at a tier above the single base node.

12. A method of generating de-assignment messages for a wireless communication device, comprising:
  determining whether to de-assign one or more resources assigned to an access terminal for at least two frames;
  if de-assignment is determined, then generating a message indicative of a request to de-assign resources, wherein the message comprises an acknowledgement message having at least three states; and
  transmitting the message on a reserved de-assignment channel.

13. The method of claim 12, wherein the reserved de-assignment channel comprises a reserved acknowledgement channel.

14. The method of claim 12, wherein the one or more resources comprise logical resources.

15. The method of claim 14, wherein generating the message comprises identifying a single logical resource to identify multiple logical resources for de-assignment.

16. The method of claim 14, wherein generating the message comprises identifying a single logical resource for de-assignment.

17. The method of claim 14, wherein generating the message comprises identifying multiple logical resources for de-assignment.

18. The method of claim 12, wherein the one or more resources are nodes of a channel tree.

19. The method of claim 18, wherein generating the message comprises identifying, in the message, a single base node of at least two base nodes to de-assign all base nodes associated with a node at a level above the single base node.

20. The method of claim 12, wherein generating the message comprises generating the message to indicate whether the resources are de-assigned for reverse link or forward link transmission.

21. The method of claim 12, wherein generating the message comprises generating the message to indicate that resources are de-assigned for reverse link and forward link transmission.

22. The method of claim 12, wherein the de-assignment channel resources are assigned solely to de-assignment channel messages.

23. An apparatus for generating de-assignment messages for a wireless communication device, comprising:
  means for determining whether to de-assign one or more resources assigned to an access terminal for at least two frames;
  means for, if de-assignment is determined, generating a message indicative of a request to de-assign resources, wherein the message comprises an acknowledgement message having at least three states; and
  means for assigning transmission of the message on a reserved de-assignment channel.

24. The apparatus of claim 23, wherein the reserved de-assignment channel comprises a reserved acknowledgement channel.

25. The apparatus of claim 23, herein the one or more resources comprise logical resources.

26. The apparatus of claim 23, wherein the one or more, resources are nodes of a channel tree.

27. The apparatus of claim 26, wherein the means for generating comprises means for identifying, in the message, a single base node of at least two base nodes to de-assign all base nodes associated with a node at a level above the single base node.

28. The apparatus of claim 23, wherein the means for generating comprises means for identifying a single logical resource for de-assignment.

29. The apparatus of claim 23, wherein the means for generating comprises means for identifying multiple logical resources for de-assignment.

30. The apparatus of claim 23, wherein the means for generating comprises means for generating the message to indicate whether the resources are de-assigned for reverse link or forward link transmission.

31. The apparatus of claim 23, wherein the means for generating comprises means for generating the message to indicate that resources are de-assigned for reverse link and forward link transmission.

32. The apparatus of claim 23, wherein the de-assignment channel resources are assigned solely to de-assignment channel messages.

33. A computer-readable medium that stores computer-executable instructions, the instructions comprising:
  instructions for determining whether to de-assign one or more resources assigned to an access terminal for at least two frames;
  if de-assignment is determined, then instructions for generating a message indicative of a request to de-assign resources, wherein the message comprises an acknowledgement message having at least three states; and
  instructions for transmitting the message on a de-assignment channel.

34. An apparatus for processing de-assignment messages received over a wireless communication channel, comprising:
  a processor configured to determine whether a de-assignment message, corresponding to a request to de-assign one or more resources assigned to an access terminal for at least, two frames, has been received over communication channel resources reserved for de-assignment messages, and to determine a state of a received acknowledgement message to determine whether a de-assignment message has been received, wherein the acknowledgement message comprises having at least three states; and
  a memory coupled to the processor.

35. The apparatus of claim 34, wherein the communication channel resources reserved for de-assignment messages are communication resources reserved for acknowledgement messages.

36. The apparatus of claim 34, wherein the one or more resources comprise a logical resource.

37. The apparatus of claim 36, wherein the processor is configured to determine that a de-assignment message identifying a single logical resource is indicative of a request to de-assign multiple logical resources.

38. The apparatus of claim 34, wherein the processor is configured to determine whether the de-assignment message is indicative of whether to de-assign resources for one of a reverse link, forward link transmission, or forward and reverse link communication.

39. The apparatus of claim 34, wherein the one or more resources are nodes of a channel tree.

40. The apparatus of claim 39, wherein theprocessor is configured to identify a single base node of at least two base nodes from the message to de-assign all base nodes associated with a node at a level above the single base node identified.

41. A method of interpreting de-assignment messages received over a wireless communication channel, comprising:
  receiving an acknowledgement message over communication channel resources reserved for de-assignment messages;

determining whether a de-assignment message, corresponding to a request to de-assign one or more resources assigned to an access terminal for at least two frames, has been received comprising:
determining a state of the received acknowledgement message to determine whether a de-assignment message has been received, wherein the acknowledgement message comprises having at least three states; and
if the de-assignment message has been received, then determining the resources that are to be de-assigned and de-assigning the resources.

42. The method of claim 41, wherein the communication channel resources reserved for de-assignment messages are communication resources reserved for acknowledgement messages.

43. The method of claim 41, wherein the one or more resources comprise a logical resource.

44. The method of claim 43, wherein determining the resources identifying a single logical resource is indicative of a request to de-assign multiple logical resources.

45. The method of claim 41, wherein determining the resources comprises determining whether the de-assignment message is indicative of whether to de-assign resources for one of a reverse link, forward link transmission, or forward and reverse link communication.

46. The method of claim 41, wherein the de-assignment channel resources are assigned solely to de-assignment, messages.

47. The method of claim 41, wherein the one or more resources are nodes of a channel tree.

48. The method of claim 47, wherein determining the resources comprises identifying a single base node of at least two base, nodes from the message to de-assign all base nodes associated with a node at a level above the single base node identified.

49. An apparatus for interpreting de-assignment messages received over a wireless communication channel, comprising:
means for determining whether a de-assignment message, corresponding to a request to de-assign one or more resources assigned to an access terminal for at least two frames, has been received over communication channel resources reserved for de-assignment messages;
means for determining a state of a received acknowledgement message to determine whether a de-assignment message has been received, wherein the acknowledgement message comprises having at least three states; and
means for, if the message has been received, determining the resources that are to be de-assigned.

50. The apparatus of claim 49, wherein the communication channel resources reserved for de-assignment messages are communication resources assigned for acknowledgement messages.

51. The apparatus of claim 49, wherein the one or more resources comprise a logical resource.

52. The apparatus of claim 51, wherein determining the resources identifying a single logical resource is indicative of a request to de-assign multiple logical, resources.

53. The apparatus of claim 49, wherein the means for determining the resources comprises means for determining whether the de-assignment message is indicative of whether to de-assign resources for one of a reverse link, forward link transmission, or forward and reverse link communication.

54. The apparatus of claim 49, wherein the de-assignment channel resources are assigned solely to de-assignment channel messages.

55. The apparatus of claim 49, wherein the one or more resources are nodes of a channel tree.

56. The apparatus of claim 55, wherein the means for determining the resources comprises means for identifying a single base node of at least two base nodes from the message to de-assign all base nodes associated with a node at a level above the single base node identified.

57. A computer-readable medium that stores computer-executable instructions, the instructions comprising:
instructions for determining whether a de-assignment message, corresponding to a request to de-assign one or more resources assigned to an access terminal for at least two frames, has been received over communication channel resources reserved for de-assignment messages;
instructions for determining a state of a received acknowledgement message to determine whether a de-assignment message has been received, wherein the acknowledgement message comprises having at least three states; and
if the message has been received, instructions for determining the resources that are to be de-assigned.

* * * * *